(12) United States Patent
Irwin

(10) Patent No.: US 6,475,592 B1
(45) Date of Patent: Nov. 5, 2002

(54) CARPET BACKING THAT PROVIDES DIMENSIONAL STABILITY

(75) Inventor: Donald A. Irwin, Dalton, GA (US)

(73) Assignee: Darwin Enterprises, Inc., Dalton, GA (US)

( * ) Notice: Subject to any disclaimer, the term of this patent is extended or adjusted under 35 U.S.C. 154(b) by 0 days.

(21) Appl. No.: 09/405,502

(22) Filed: Sep. 23, 1999

Related U.S. Application Data

(63) Continuation-in-part of application No. 09/370,148, filed on Aug. 9, 1999, which is a continuation-in-part of application No. 08/840,395, filed on Apr. 29, 1997, now Pat. No. 5,962,101.

(51) Int. Cl.$^7$ ............................. B32B 33/00; B32B 7/08
(52) U.S. Cl. ........................................ 428/95; 428/96
(58) Field of Search ...................... 428/95, 96

(56) References Cited

U.S. PATENT DOCUMENTS

| | | | |
|---|---|---|---|
| 2,713,012 A | | 7/1955 | Hartstein |
| 3,285,797 A | | 11/1966 | Harrison et al. |
| 3,533,893 A | * | 10/1970 | Hartstein ..................... 428/95 |
| 3,542,632 A | | 11/1970 | Eickhoff |
| 3,616,104 A | | 10/1971 | Kuzmick |
| 3,616,137 A | | 10/1971 | Horton |
| 3,642,516 A | * | 2/1972 | Gasaway et al. .......... 117/65.2 |
| 3,735,988 A | | 5/1973 | Palmer et al. |
| 3,874,964 A | | 4/1975 | Cogliano et al. |
| 3,943,864 A | | 3/1976 | Feighery et al. |
| 3,966,212 A | | 6/1976 | Mason |
| 4,010,302 A | * | 3/1977 | Anderson et al. ............. 428/95 |
| 4,096,302 A | | 6/1978 | Thibodeau et al. |
| 4,389,434 A | | 6/1983 | Polman |
| 4,426,415 A | | 1/1984 | Avery |
| 4,439,476 A | | 3/1984 | Guild |
| 4,705,706 A | | 11/1987 | Avery |
| 5,380,574 A | | 1/1995 | Katoh et al. |
| 5,470,658 A | | 11/1995 | Pearlman et al. |
| 5,540,968 A | * | 7/1996 | Higgins ........................ 428/95 |
| 5,578,357 A | * | 11/1996 | Fink ............................. 428/95 |
| 5,612,113 A | | 3/1997 | Irwin, Sr. |
| 5,962,101 A | * | 10/1999 | Irwin, Sr. et al. ............. 428/92 |

FOREIGN PATENT DOCUMENTS

EP 1 076 125 * 2/2001

OTHER PUBLICATIONS

Product Brochure: Lutradur Tuft–Backings Quality in All Dimensions; The Freudenberg Nonwovens Group; Durham, NC; USA.

* cited by examiner

*Primary Examiner*—Cheryl A. Juska
(74) *Attorney, Agent, or Firm*—Chambliss, Bahner & Stophel, P.C.

(57) ABSTRACT

A tufted carpet is made by tufting yarn through a primary backing of at least two layers, including a first backing layer and a second backing layer. The first backing layer is formed of a woven material, a non-woven material, or a composite of a woven or non-woven material and a plastic sheet material. The second backing layer is formed of a woven material of ribbons of polypropylene, polyethylene or combinations of polypropylene and polyethylene, a woven fiber glass material, a leno weave material, an open weave material, a plastic net or a plastic sheet material. A plurality of tufts of yarn that are sewn through the primary backing are exposed on one side of the primary backing for forming face yarns, and also form a plurality of back stitches on the opposite side of the primary backing. At least a major portion of the back stitches secure each layer of the primary backing to each other layer.

10 Claims, 8 Drawing Sheets

CARPET BACKING THAT PROVIDES DIMENSIONAL STABILITY

CROSS-REFERENCE TO RELATED APPLICATIONS

This application is a continuation-in-part of the copending application entitled "Dimensionally Stable Tufted Carpet", which was filed on Apr. 29, 1997 and assigned a Ser. No. of 08/840,395, now U.S. Pat. No. 5,962,101, the disclosure of which is fully incorporated herein by reference. This application is also a continuation-in-part of the copending application entitled "Backing For Carpet That Imparts Dimensional Stability", which was filed on Aug. 9, 1999 and assigned a Ser. No. of 09/370,148 (which is also a continuation-in-part of the aforementioned application bearing Ser. No. 08/840,395), the disclosure of which is also incorporated herein by reference.

FIELD OF THE INVENTION

This invention relates generally to tufted carpeting, and more particularly to tufted carpeting having an improved primary backing which includes two or three backing components or layers. This primary backing construction provides dimensional stability to the carpet without the necessity for a secondary backing.

BACKGROUND OF THE INVENTION

In the past, tufted carpeting was made by tufting yarn into a backing of woven jute or the like. Because the jute backing was heavy and stable, it was coated on the back with latex or another adhesive to lock in the tufts, and the carpet was ready to install. More recently, however, various light weight materials have been used as a primary backing through which yarn is tufted, and a secondary backing of a heavier or more stable material is adhered to the back of the primary backing by an adhesive.

Currently, the most popular primary backings are made of polypropylene materials, either woven or non-woven. Such backings are preferred because they are inexpensive, and the material has an oily quality that provides for smooth entry and exit of the tufting needles. In addition, the material is quite elastic so the hole tends to close around the yarn after the tufting needle is withdrawn. However, the polypropylene backings have some disadvantages as well. Polypropylene is a thermoplastic elastomer, so the backing is subject to degradation by excess heat and is rather easily stretched through the application of tension.

Typically, after face yarns are tufted into a primary backing, the unfinished carpet is back coated with an adhesive to lock in the stitches. Without the back coating, the tufts are very easy to pull out, so the back coating is an important finishing step. During the coating process, however, the carpet is dimensionally unstable because of the presence of only the light-weight primary backing. Consequently, it is not uncommon to have elongation in the carpet in the range of 5%–20% during the back coating process. While this elongation may appear to "create" more carpet, it does so by reducing the amount of face yarn per unit area, so the resulting carpet will not be as densely tufted. Another problem with elongation is that the backing may not stretch uniformly, with the result that any pattern in the carpet will be distorted. Efforts have been made to physically prevent elongation of the carpet, but such efforts require additional equipment, time and effort, and still do not entirely solve the basic problem of stretching of the primary backing.

It is known to make rugs and carpets having a plurality of backings. For example, U.S. Pat. No. 2,713,012 of Hartstein discloses a tufted rug having dual primary backings of cotton and jute or the like. The Hartstein reference does not contemplate back coating of the rug, and instead relies on the double backing to assist in holding in the tufts. Furthermore, the jute backing is heavy enough to stabilize the rug so that elongation is minimized. U.S. Pat. No. 4,426,415 of Avery discloses a carpet in the nature of artificial turf having a plurality of primary backings and a conventional back coating. These backings varying in fineness from the bottom to the top of the carpet. All of the Avery backings are of the same material, and polypropylene is specifically mentioned. Since the Avery reference contemplates back coating of the carpet, the problem of elongation of the carpet and the resulting distortion of any pattern will still be present, though perhaps to a lesser degree because of the greater strength inherent in multiple backings. U.S. Pat. No. 4,705,706 of Avery discloses a multiple-layer primary backing of nylon or the like. Face yarns of polyethylene are tufted through this backing and the back stitch is set by heat, rather than by a separately applied adhesive. The multiple layers of backing described in this patent allow sand to infiltrate when the carpet is used as outdoor turf.

It is also known, as described in U.S. Pat. No. 4,096,302 of Thibodeau et al., to provide a carpet backing comprising non-woven fiber material that is needle punched into plastic netting. The fiber material, comprised of nylon, rayon, or similar fibers having a fiber length of about one to six inches, is deposited on the plastic net with the fibers aligned in the weft direction. The fibers are then secured to the net by needle punching them through the net. The fibers may be deposited and punched through the net serially one side at a time, or they may be deposited on both sides of the net and simultaneously needle punched through both sides of the net with a double acting loom. After the backing has been formed in this manner, carpet yarn is tufted into the backing. The tufts are held in the backing primarily by the fibers, but a back coating of adhesive may also be applied to the tufted carpet.

It is also known to provide a backing system for carpet comprising a primary backing and a secondary backing, with a thin film of liquid-impervious thermoplastic material bonded either to the back of the primary backing or the back of the secondary backing. U.S. Pat. No. 5,612,113 describes such a backing system in which yarn is tufted into a conventional primary backing such as is generally comprised of polypropylene. A conventional secondary backing or foam cushion is thereafter bonded to the primary backing to lock in the back stitches, by application of latex or other adhesive. In addition, however, a thin liquid-impervious film is applied either to the back of the primary backing or to the back of the secondary backing by use of an adhesive.

My copending patent application entitled Dimensionally Stable Tufted Carpet, Ser. No. 08/840,395, now U.S. Pat. No. 5,962,101, describes a tufted carpet having a double-layer primary backing, the first part of such backing being formed of a woven or non-woven material, preferably a conventional woven ribbon polypropylene, and the second part having warp yarns and fill yarns, with at least the warp yarns having greater strength and less stretchability than the first part of the primary backing. The face yarns are tufted through both parts of the double-layer backing, which secures the two parts together, with the second part forming the back side of the carpet. Because the second part of the backing is of an open weave material, at least some of the back stitches protrude from the back of the carpet, so that an applied adhesive can truly encapsulate such stitches for maximum strength.

With the dual-layer primary backing, it has been found that the tufts are held more securely, even without back coating of the carpet, so the carpet can be handled as necessary without fear of loss of any substantial amount of face yarns. During back coating or other processing of the carpet, the non-stretchable part of the backing in the carpet prevents elongation or other stretching of the carpet. However, further research conducted since the time of filing of our co-pending application described above has revealed that dimensional stability may be obtained regardless of which of the first or second backing layers forms a first side of the primary backing (on which the tufts of yarn form face yarns) or the opposite (or back) side of the primary backing (on which the back stitches are formed), provided that suitable materials are selected for use as the first and second backing layers. Other research has revealed that several other materials may be incorporated into the primary backing for further improvement in the dimensional stability and overall quality of the carpet.

ADVANTAGES OF THE INVENTION

Accordingly, the invention described and claimed herein provides among its advantages greater dimensional stability in tufted carpet than has been previously available. Another advantage of the invention is that the quality of the carpet made according to the invention, including the integrity of the pattern and the density of face yarns per unit area is consistently high. Yet another advantage of an embodiment of the invention in which the first backing is comprised of a composite of a woven or non-woven material and a plastic sheet material, is a carpet with improved dimensional stability and moisture resistance. Still another advantage of an embodiment of the invention which includes a third layer in the primary backing is a carpet with even greater dimensional stability.

Additional advantages and features of this invention will become apparent from an examination of the drawings and the ensuing description.

EXPLANATION OF CERTAIN TECHNICAL TERMS

As used herein, a plastic sheet material includes pliable sheets and films of any thickness that are comprised of any of various nonmetallic compounds that are synthetically produced, usually by polymerization, and which may be either thermosetting or thermoplastic. The term film is used synonymously with the term sheet herein.

As used herein, a composite of a woven or non-woven material and a plastic sheet material includes any of various combinations of woven or non-woven materials and a plastic sheet material. Such combinations include woven or non-woven materials to which a plastic sheet is bonded by use of an adhesive, by heat, or by extrusion of the plastic material thereon, as well as laminates and co-extrusions of such materials. A composite may also comprise a woven or a non-woven material and a plastic sheet material which are in intimate contact substantially across the area of the sheet material.

As used herein, particulate material includes powders and granules of various particle sizes.

As used herein, thermofusible particulate materials are those that may be deposited, dispensed or applied as particulate materials, which upon heating will coalesce and subsequently fuse together.

SUMMARY OF THE INVENTION

The invention comprises a tufted carpet having a primary backing comprised of at least two layers, including a first backing layer and a second backing layer. The first backing layer comprises a woven or a non-woven material, or a composite of a woven or non-woven material and a plastic sheet material. The second backing layer may comprise a woven material of ribbons of polypropylene, polyethylene or combinations of polypropylene and polyethylene. The second backing layer may also comprise a woven fiber glass material, a leno weave material, an open weave material, a plastic net or a plastic sheet material. A plurality of tufts of yarn are sewn through the primary backing, so that the tufts of yarn are exposed on one side of the primary backing for forming face yarns. The tufts of yarn also form a plurality of back stitches on the opposite side of the primary backing. At least a major portion of the back stitches secure each layer of the primary backing to each other layer. A method for making a tufted carpet having the characteristics set out above is also described and claimed herein.

In order to facilitate an understanding of the invention, the preferred embodiments of the invention are illustrated in the drawings, and a detailed description thereof follows. It is not intended, however, that the invention be limited to the particular embodiments described or to use in connection with the apparatus illustrated herein. Various modifications and alternative embodiments such as would ordinarily occur to one skilled in the art to which the invention relates are also contemplated and included within the scope of the invention described and claimed herein.

BRIEF DESCRIPTION OF THE DRAWINGS

The presently preferred embodiments of the invention are illustrated in the accompanying drawings, in which like reference numerals represent like parts throughout, and in which.

DESCRIPTION OF THE PREFERRED EMBODIMENTS OF THE INVENTION

Figure 1:
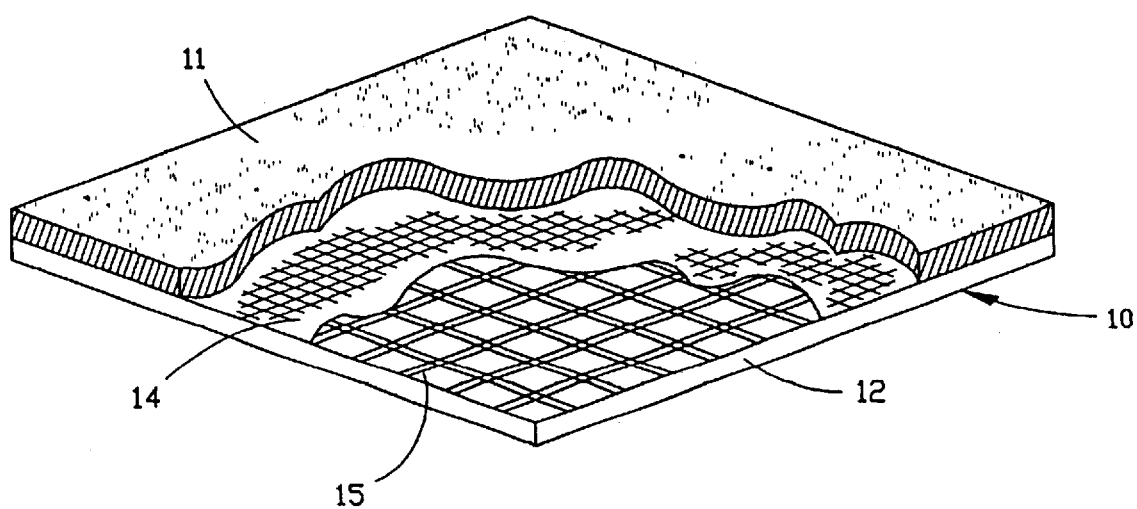
FIG. 1 is a perspective view of a piece of carpet that is partially broken away to show its construction, said carpet having been made according to a first embodiment of the present invention, in which the first backing layer is the upper layer and the second backing layer is the lower layer.
Figure 9:
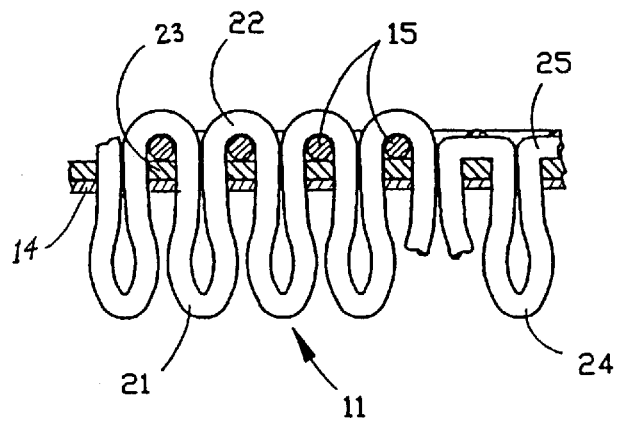
FIG. 9 is a highly enlarged cross-sectional view showing the construction of the embodiment of the carpet illustrated in FIG. 8.
Figure 10:
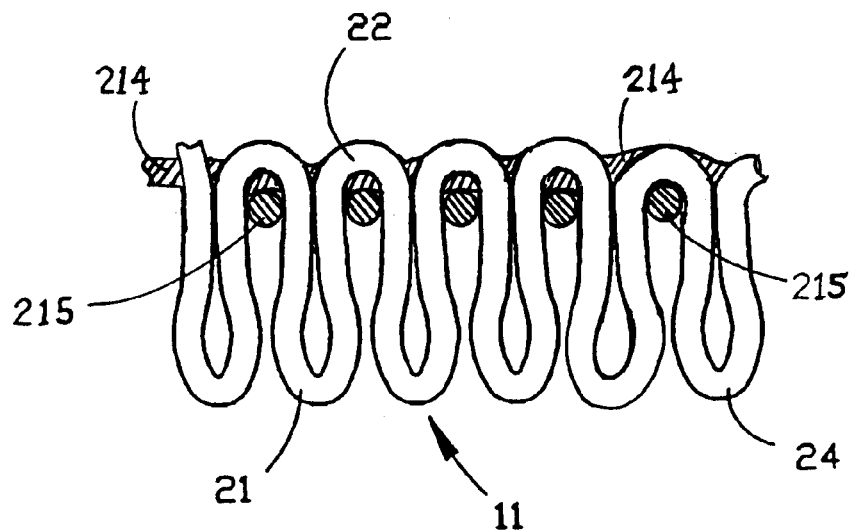
FIG. 10 is a highly enlarged cross-sectional view showing the construction of a third embodiment of the present invention, in which the first backing layer is the lower layer and the second backing layer is the upper layer.
Figure 11:
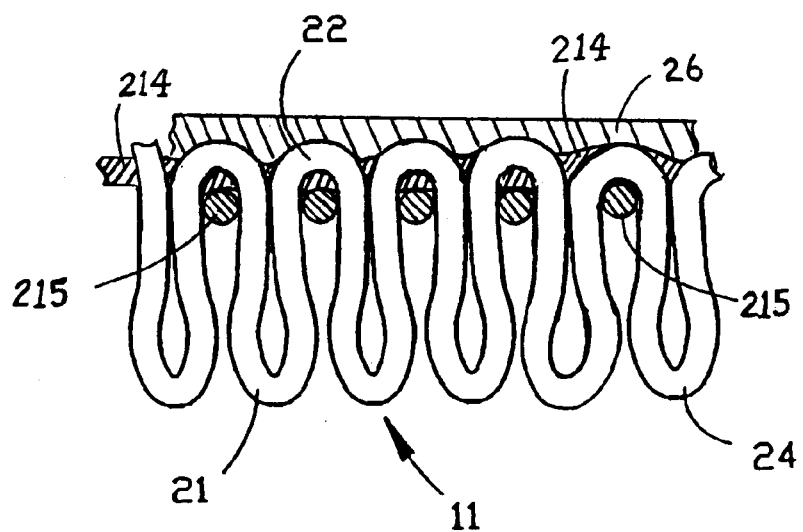
FIG. 11 is a view similar to that of FIG. 10, but showing a back coating in place to lock in the stitches.

Referring now more particularly to the drawings, and to those embodiments of the invention here presented by way of illustration, FIG. 1 shows a piece of carpet generally designated at 10, the carpet 10 comprising face yarns 11 and a primary backing 12. The primary backing comprises at least two layers, an upper backing layer and a lower backing layer. The term "upper backing layer" as used herein indicates the backing adjacent to the face of the carpet. Similarly, the term "lower backing layer" indicates the backing on the bottom when the carpet is laid. The back side of the lower backing layer, or the side on the bottom when the carpet is laid, may also be referred to as the "back" of the primary backing. Either the upper or lower backing layer may be designated as the first backing layer, and the other may be designated as the second backing layer. In FIGS. 1 through 9, the first backing layer 14 will be the upper layer and the second backing layer will be the lower layer, although as mentioned above, the first backing layer and the second backing layer may be interchangeable between upper and lower locations. Examples I through XIII illustrate embodiments of the invention in which the first backing layer is the upper layer and the second backing layer is the lower layer. FIGS. 10 and 11, on the other hand, show an embodiment of the invention in which the first backing layer is the lower layer and the second backing layer is the upper layer. Example IV is illustrative of this construction. The first backing layer is comprised of a woven material or a non-woven material. Typical woven materials and non-woven materials that are suitable for use as the first backing layer include those made from polypropylene, polyester, polyamide, jute and viscose rayon. In one embodiment of the invention, first backing layer 14 will be a conventional primary-type backing material woven from polypropylene ribbons. Such backings utilize a relatively soft polypropylene so the tufting needles will penetrate easily, but they are inherently dimensionally unstable. In another embodiment of the invention, the first backing layer may comprise a non-woven, spun-bonded material comprised of polyester, polypropylene or nylon. In such event, it is preferred that the first backing layer is comprised of a spun-bonded fabric such as the "LUTRADUR" brand of spun-bonded polyester that is sold by Freudenberg Spunweb Company, or the "COLBAC" brand of spun-bonded nylon-coated polyester that is sold by Akzo Fibers B. V.

The first backing layer may also be a composite of a woven or non-woven material and a plastic sheet material, such as, for example, a composite of a plastic sheet that is extruded onto woven or non-woven materials. Preferably, in this embodiment of the invention, the first layer is comprised of a high density polyethylene film that is extruded onto or otherwise applied as a coating to woven ribbons of polypropylene, polyethylene or combinations of polypropylene and polyethylene. Such a material as is known for use in bagging and general purpose tarps is sold by Fabrene Inc. of Mississauga, Ontario, Canada as a "Type KKN1" industrial synthetic fabric.

Second backing layer 15 may be formed of a woven fiber glass material or an open weave material of fiber glass or the like to maximize the stability of the carpet of the present invention. However, the second backing layer might also be an open weave of polypropylene material, which construction will also provide reasonable dimensional stability. Furthermore, the particular polypropylene used will preferably be a harder material having greater strength and less stretchability than the softer material used in the conventional primary backing. Similarly, other materials having less stretch may be used, such as polyester or other polymeric materials. Of course the number of picks per inch in the fabric of the second backing layer can be varied along with the particular fiber to attain the desired quality and cost.

The second backing layer may also be a woven material, such as a conventional primary-type backing material woven from polypropylene ribbons, polyethylene ribbons or ribbons comprised of combinations of polypropylene and polyethylene. If such material is used for the second backing layer, one preferred embodiment of the invention includes a first backing layer comprising a non-woven, spun-bonded material comprised of polyester, polypropylene or nylon such as the "LUTRADUR" brand of spun-bonded polyester that is sold by Freudenberg Spunweb Company, or the "COLBAC" brand of spun-bonded nylon-coated polyester that is sold by Akzo Fibers B. V.

Spun-bonded backings have not generally been used as primary backings for broadloom carpet, because they can easily stretch and because the needle holes do not close around the yarn after tufting. Furthermore, conventional backings woven from polypropylene ribbons and the like are also stretchable and subject to degradation by excessive heat. However, it has been found that a primary backing comprised of a non-woven spun-bonded material and a woven material of conventional primary-type ribbons may provide advantageous dimensional stability.

In another preferred embodiment of the invention, backing 15 comprises a leno weave having mono-filaments or tape yarn in the warp direction, and yarn comprised of a spun fiber in the weft direction, although the invention also contemplates a use of open weave material comprised of mono-filaments or tape yarn in both directions. The mono-filaments or tape yarn are preferably made from polypropylene, and such will yield a high degree of non-stretchability. If spun fibers are used in the weft direction, such fibers will increase adhesion between backing layer 15 and any adhesive (or thermofusible material, as described in more detail hereinafter) that is used to back coat the carpet (provided that the second layer forms the lower layer of the primary backing). In any event, the weft yarns are preferably selected from the group consisting of polypropylene, polyester, nylon, cotton, fiber glass and combinations thereof. Second backing layer 15 may also be a plastic sheet or a plastic net material comprised of either a thermoplastic or a thermosetting material. If a plastic sheet material, the second backing layer is preferably comprised of a sheet of polyethylene, polypropylene, polyurethane, polyester or PVC. If a plastic net material, the second backing layer is preferably comprised of a thermoplastic material such as polypropylene, having a strand count of from about 12×12 per square inch to about 4×4 per square inch, and a weight of from about two pounds per thousand square feet to about ten pounds per thousand square feet. Preferably, the net material used in connection with the invention is comprised of strands which are integrally extruded at the joints.

Furthermore, it is preferred that the net be oriented after it is extruded. By orienting, it is meant that the net is heated and stretched at a temperature above its second glass transition temperature so that the net will take a permanent stretch to a dimension at least three times as great as its unoriented dimension. Orienting the net increases its tensile strength and reduces its weight and cost. Such net materials as are preferred for use as the second backing layer may be obtained from Conwed Corporation of St. Paul, Minn.

Figure 2:
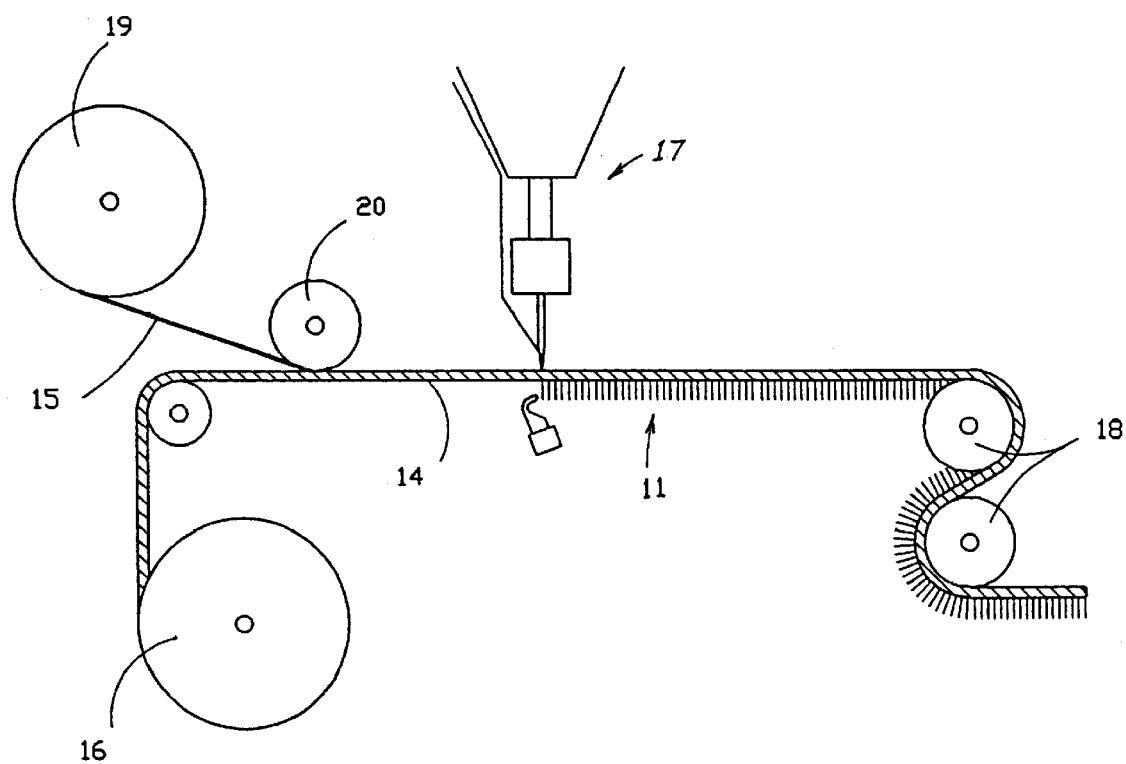
FIG. 2 is a schematic illustration showing the tufting of carpet according to one embodiment of the present invention.

As illustrated in FIG. 2, the carpet of the present invention is tufted in a generally conventional way. The first backing layer 14 of the primary backing of the invention is mounted on roll 16, and passes through tufting machine 17 to exit rolls 18. In accordance with the present invention, the second layer 15 of the primary backing is mounted on a roll 19, and is held against the first backing layer 14 by roll 20. With the two parts of primary backing 12 held together, tufting machine 17 sews tufts of yarn through the primary backing 12, so that said tufts are exposed on one side of the primary backing for forming face yarns 11. It will therefore be understood that the carpet, immediately on being tufted, has the strength and stability attributes described above. Those skilled in the art to which the invention relates will realize that carpet may be subject to stretching and distortion as it emerges from the tufting machine, but the present invention substantially eliminates any such stretch and distortion.

The second layer of the primary backing of the present invention may include open weave fabrics of a hard polypropylene and even fiber glass. The use of such materials would not be expected to provide satisfactory results by those having ordinary skill in the art to which the invention relates, because of a fear of needle deflection in the tufting process. In conventional tufting processes, if some of the needles engage "hard" fibers or the like in the backing material, they may move laterally in attempting to penetrate the backing. There is also a danger of breaking a needle in conventional tufting through "hard" backings, and there is a great danger of producing deviant stitches that reduce the quality of the finished goods. Those skilled in the art to which the invention relates have always believed that it was not possible to tuft into "hard" backings comprised of many of the materials that may be freely used in backing 15 because of needle deflection. Consequently, very soft polypropylene ribbons, or spun fibers, or soft non-woven polypropylene, or other spun-bonded fabrics (such as the "LUTRADUR" brand of spun-bonded polyester that is sold by Freudenberg Spunweb Company, or the "COLBAC" brand of spun-bonded nylon-coated polyester that is sold by Akzo Fibers B.V.) are generally used in a conventional primary backing, although some of these, such as for example, the spun-bonded fabrics, are not commonly used in broadloom carpet construction. In contrast, the carpet of the present invention may be made by tufting through a primary backing including a second layer of open weave fabric of "hard" polypropylene or even fiber glass without significant needle deflection.

Figure 3:
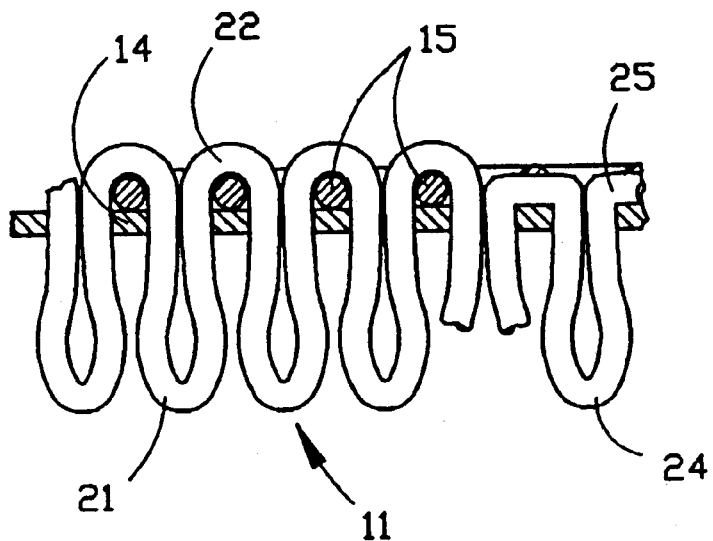
FIG. 3 is a highly enlarged cross-sectional view showing the construction of the embodiment of the carpet illustrated in FIG. 1.

A more thorough understanding of the construction of the carpet of one embodiment of the present invention may be obtained by examination of FIG. 3. As shown therein, tufts 21 of face yarn 11 pass through both the first backing layer 14 and the second backing layer 15 of primary backing 12 in such manner that back stitches 22 loop over the strands of the second backing layer 15. Since backing layer 15 may be comprised of a woven ribbon material, a leno weave material or an open weave material, some of the stitches are likely to miss the strands of backing layer 15 and engage only backing layer 14. As shown in FIG. 3, the yarns of tufts 24 pass through only the first backing layer 14, and the resulting back stitches 25 lie against the lower side of backing layer 15. This phenomenon is further illustrated in FIG. 7 where back stitches 22 are shown looping over the strands of second backing layer 15, while back stitches 25 are shown between the strands of backing layer 15, and engaged with only the first backing layer 14.

Figure 4:
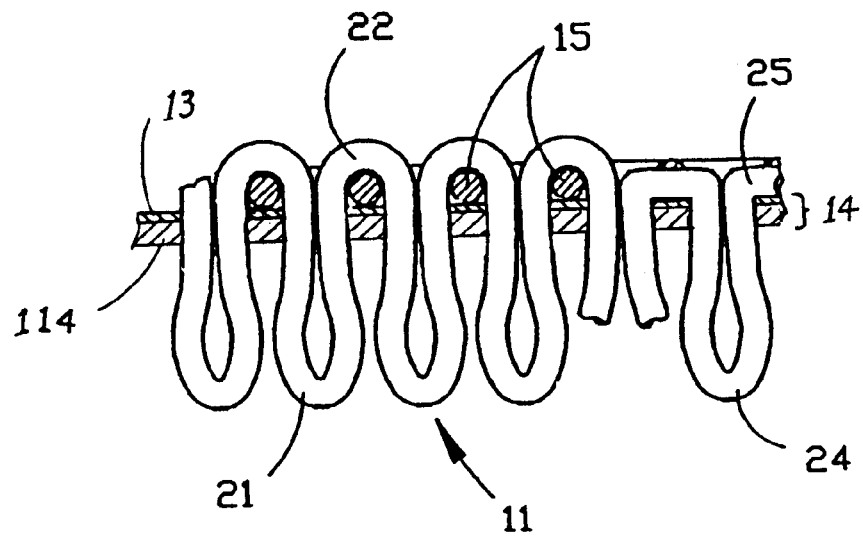
FIG. 4 is a view similar to that of FIG. 3. but showing the construction of another embodiment of the carpet of the present invention.

FIG. 4 shows carpet of a similar construction to that of FIG. 3. In FIG. 4, first backing layer 14 is comprised of a woven or non-woven material 114 to which a moisture-impervious sheet or film 13 has been applied, either in a separate process (such as by application of an adhesive, by heating or by co-extrusion) or by a separate feed of film that is placed in intimate contact with non-woven material 114 (not shown). Otherwise, the construction of the carpet of FIG. 4 is identical to that of FIG. 3.

In view of the construction described above, it will be understood that the tufts of yarn are mechanically locked into the system. In the conventional tufted carpet, the tufts, like tuft 24, extend only through the soft and stretchable material (comparable in some respects to first layer 14), but without the additional fabric layer 15 to hold them. Carpet 10, made according to the invention with a dual-layer primary backing (including layer 15), does not stretch or distort noticeably, but is dimensionally stable even as it leaves the tufting machine.

In the above and foregoing discussion, it should be understood that the term "primary backing" indicates a sheet of material through which yarns are inserted. The term "secondary backing" indicates a sheet of material that is fixed to the back of the tufted carpet, such material not having yarns inserted therethrough.

Those skilled in the art will realize that, even with the mechanical lock for tufts 21 and 24, it is desirable to back coat the carpet to assure that the tufts will not pull out. One common form of back coating utilizes a small amount of adhesive, and the adhesive is allowed to coat the back stitch very lightly. The carpet of the present invention works well with such back coating system, because the back stitches such as stitches 22 stand out from the backing, allowing the adhesive to coat the sides of the stitches. Many adhesives used do not actually adhere well to the fiber, but depend on simply encapsulating the stitches to prevent their pulling out. With the protruding back stitches 22, the yarns can be well encapsulated and thereby firmly anchored to the primary backing and the fibers of the yarns can be locked into place so as to prevent pilling and fuzzing.

Figure 5:
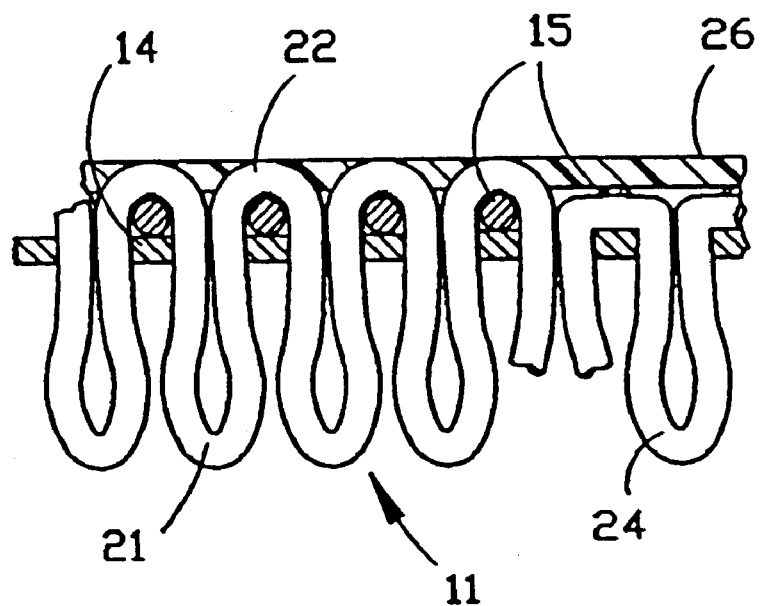
FIG. 5 is a view similar to that of FIG. 3, but showing a back coating in place to lock in the stitches.

Sometimes it is preferable to back coat the carpet to provide a smooth rear surface, as shown in FIG. 5. The carpet of FIG. 5 is like that of FIG. 3, except that there is a coating of adhesive or other back coating 26 on the primary backing. Back coating 26 is thick enough that the entire back stitch is covered, and the back of the carpet is smooth. It should also be noted that if the primary backing includes a moisture impervious sheet, it will be necessary to back coat the carpet to preserve the fluid barrier characteristic, since tufts of yarn will pierce the primary backing during the tufting process.

Figure 6:
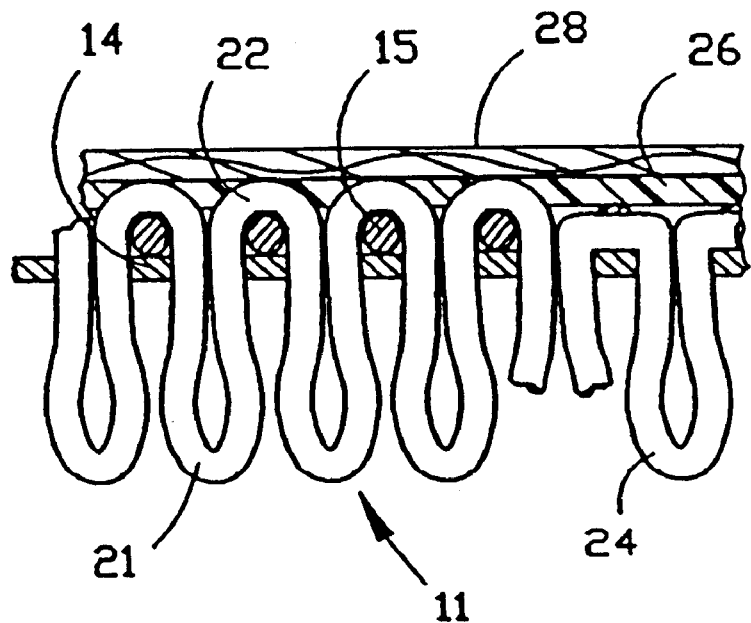
FIG. 6 is a view similar to that of FIG. 5 but showing a secondary backing placed over the back coating.
Figure 7:
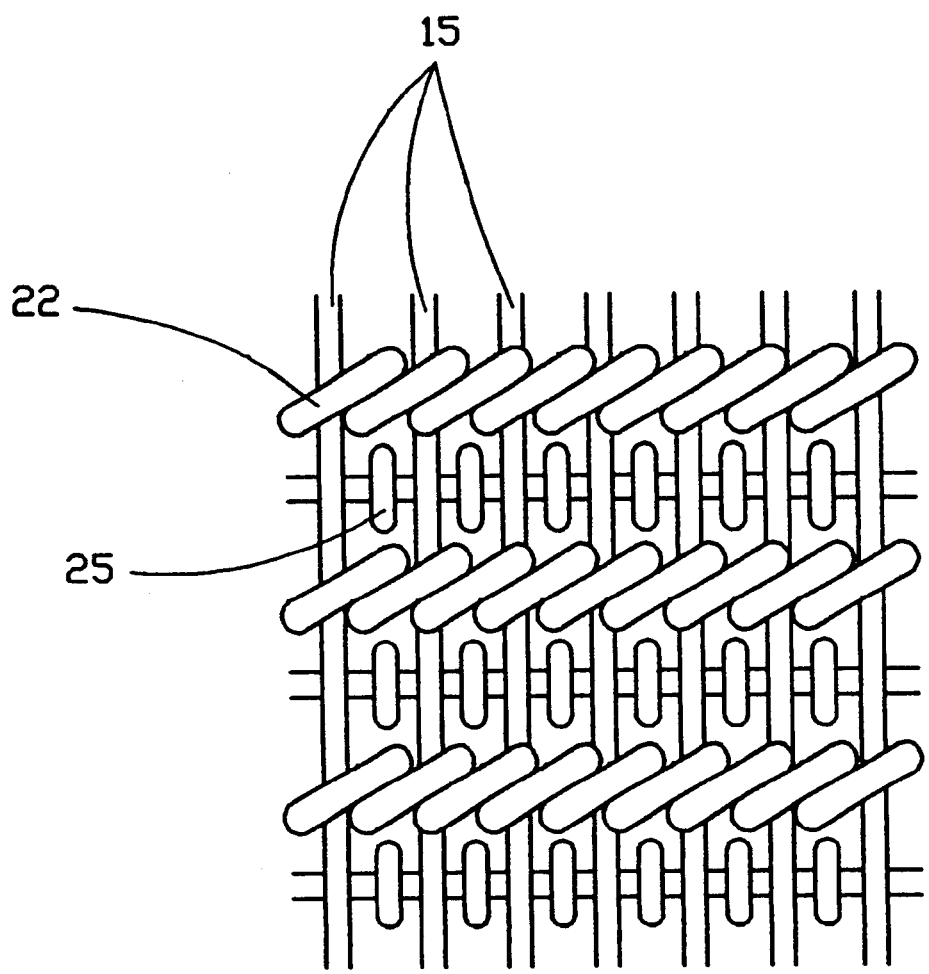
FIG. 7 is a schematic illustration showing a plan view of the back of a carpet made according to the embodiment of the invention illustrated in FIG. 1.

FIG. 6 shows a modified form of the carpet of FIG. 5. In FIG. 6, adhesive coating 26 is also used to adhere a secondary backing 28 to the carpet. While a secondary backing will not be required on the carpet of the present invention for most uses, one may wish to use a tricot as a secondary backing for installations in which hook and loop fasteners are used to hold the carpet in place. In this event, the tricot secondary backing performs the function of the loop portion of the hook and loop fastener for holding the carpet in place on a floor.

The carpet of FIG. 6 may have other sheet materials adhered thereto as a secondary backing. For example, one might select any of the conventional woven or non-woven materials or a sheet of foamed material as a secondary backing. The foamed material may be mechanically frothed and applied, may be foamed in place, or may be formed as a sheet and subsequently adhered to the carpet. All these techniques are known in the art to which the invention relates. In addition, a waterproof barrier film may also be applied as a secondary backing as disclosed in U.S. Pat. No. 5,612,113. Still other secondary backings will suggest themselves to those skilled in the art.

Figure 8:
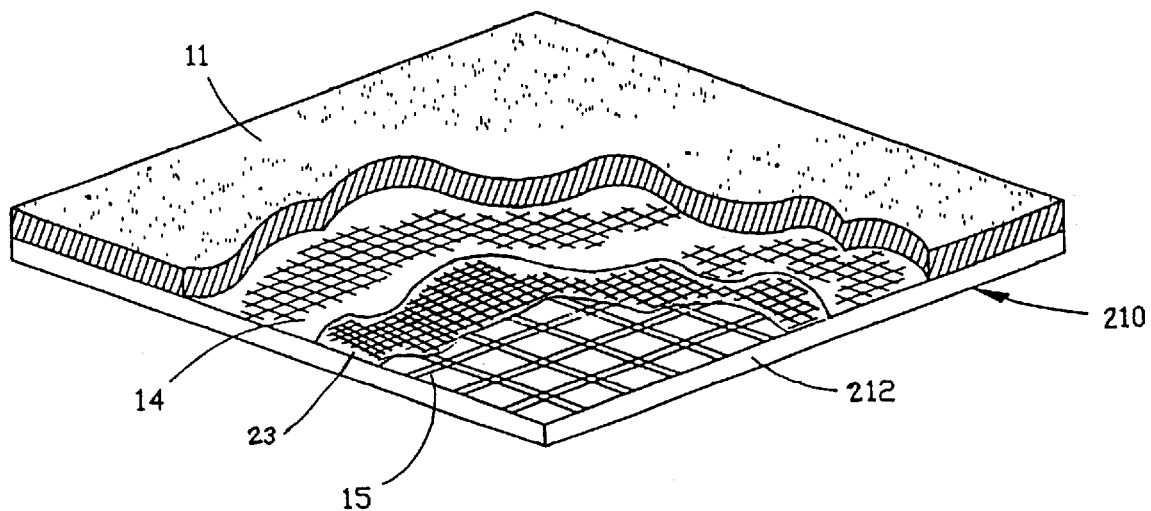
FIG. 8 is a perspective view of a piece of carpet that is partially broken away to show its construction, said carpet having been made according to a second embodiment of the present invention, in which the first backing layer is the upper layer, the second backing layer is the lower layer and a third backing layer is interposed between the first backing layer and the second backing layer.

FIG. 8 shows another embodiment of the invention in the form of a piece of carpet generally designated at 210 which comprises face yarns 11 and a primary backing 212. The primary backing includes a first backing layer 14, a second backing layer 15 and a third backing layer 23. First backing layer 14 may be formed of a woven, non-woven or plastic sheet material, or a composite of a woven or non-woven material and a plastic sheet material, such as is employed in the embodiment of the invention illustrated in FIG. 1. Second backing layer 15 is also comparable to that employed in the embodiment of FIG. 1, and may comprise a woven material of ribbons of polypropylene, polyethylene or combinations of polypropylene and polyethylene, a woven fiber glass material, a leno weave, open weave, plastic net or plastic sheet material. Third backing layer 23, which is interposed between the first backing layer and the second backing layer, preferably comprises a material that is different from the material which comprises the first and second layers. Such material is preferebly selected from the group consisting of woven material of ribbons of polypropylene, polyethylene or combinations of polypropylene and polyethylene, a woven fiber glass material, a leno weave material, an open weave material or a non-woven, spun-bonded material comprised of polyester, polypropylene or nylon-coated polyester. Preferably, the first backing layer is comprised of a spun-bonded fabric (such as the "LUTRA-DUR" brand of spun-bonded polyester that is sold by Freudenberg Spunweb Company, or the "COLBAC" brand of spun-bonded nylon-coated polyester that is sold by Akzo Fibers B.V.), the second backing layer is comprised of a woven material of polypropylene ribbons and the third layer is comprised of an open weave or leno weave material. As shown in FIGS. 8 and 9, the third backing layer 23 is interposed between first backing layer 14 and second backing layer 15, and the yarn 21 is tufted through the first, second and third backing layers of the primary backing, so that at least a major portion of the back stitches secure first backing layer 14 to second backing layer 15 with third backing layer 23 interposed therebetween. This embodiment of the invention will likely provide maximum dimensional stability, especially when the preferred materials are used for the various backing layers, as described above.

FIGS. 10 and 11 illustrate the construction of a carpet made according to the invention in which the first backing layer 214 is the lower layer and the second backing layer 215 is the upper layer. As shown in FIG. 10, tufts 21 of face yarn 11 pass through both the first backing layer 214 and the second backing layer 215 of the primary backing in such manner that back stitches 22 loop over the strands of the second backing layer 215. However, some of the stitches may only pass through and engage second backing layer 215. Thus, as shown in FIG. 10, the yarns of tufts 24 pass through only the second backing layer 215, and the resulting back stitches 25 lie against the lower side of first backing layer 214. This phenomenon is also illustrated in FIG. 11, which shows a coating of adhesive or other back coating 26 on the primary backing. Back coating 26 is thick enough that the entire back stitch is covered, and the back of the carpet is smooth.

Figure 12:
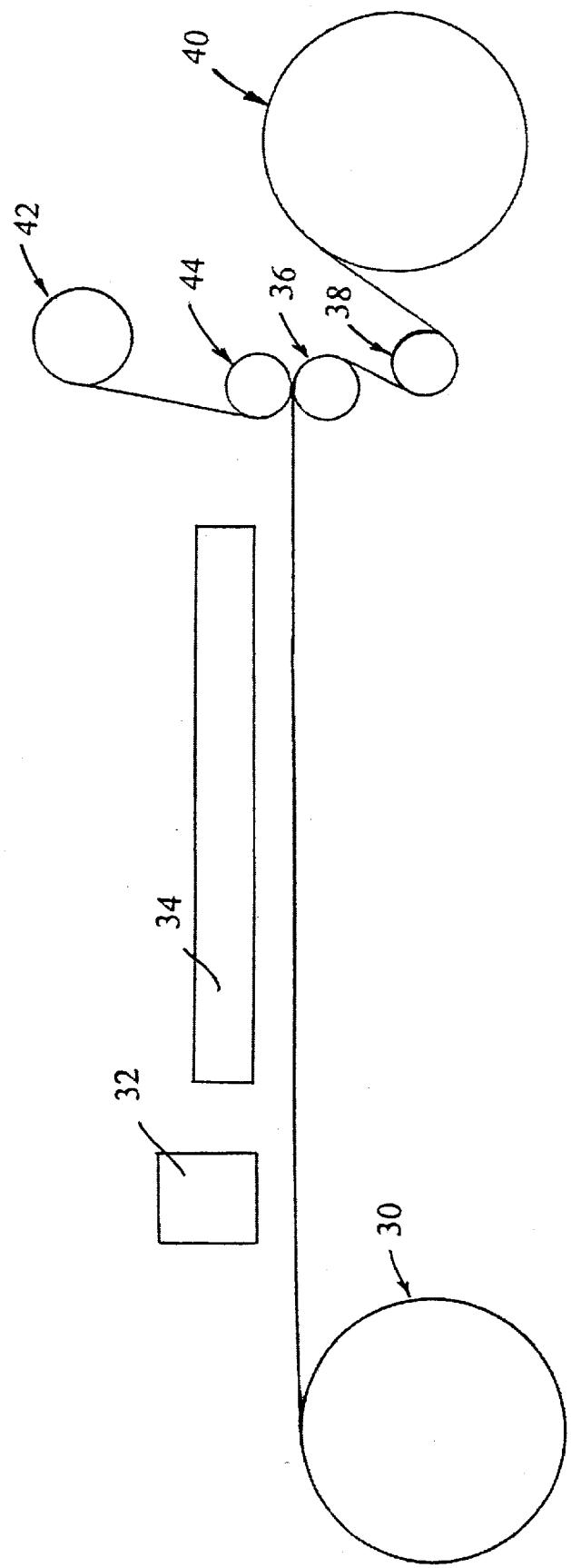
FIG. 12 is a schematic illustration of an apparatus for applying a preferred back coating to carpet made according to the invention.

FIG. 12 illustrates the application of a preferred type of back coating to carpet made according to the invention. As shown therein, a roll 30 of carpet made by tufting yarn through the primary backing of the invention is passed beneath a powder scattering or coating head 32, which deposits a quantity of thermofusible particulate material on the back of the primary backing. Suitable thermofusible particulate materials for use in connection with the invention include powders and granules of thermoplastic polymers such as polyethylene, ethylene vinyl acetate, ethylene vinyl acrylate, low-melting point polyamides and syndiotactic polypropylene. Such materials should have a melting point lower than that of the materials of either the first or second layer of the primary backing. If it is desired to provide a secondary backing sufficient to obtain fiber lock and tuft bind, about 6 to about 15 ounces of thermofusible particulate material may be applied for each square yard of carpet. If it is desired that the secondary backing of thermofusible material serve also as a fluid barrier, about 20 to about 50 ounces per square yard of particulate material should be deposited on the back of the primary backing. The amount of particulate material used will depend on the carpet construction and the fiber face weight.

After deposition of the thermofusible particulate materials on the back of the primary backing, the carpet is conveyed through infrared sintering oven 34 where the thermofusible materials are heated so as to coalesce and cover or encapsulate the back stitches. The carpet with the thermofusible materials thereon then passes over tensioning rolls 36 and 38 and is stored on reel 40. A secondary backing material may also be applied to the back coating from roll 42 by application of nip pressure by roll 44. Preferably, any such secondary backing is applied before the thermofusible materials have fully cured, so that the secondary backing will adhere to the thermofusible material back coating on the primary backing. Suitable secondary backing materials may include any of those known to those having ordinary skill in the art to which the invention relates, and may also include moisture impervious sheets, preferably those comprised of polyethylene and co-extruded polyethylene films. If co-extruded polyethylene films are employed, it is preferred that one component of the co-extruded film has a lower melting point than the other component, and that the component with the lower melting point be placed next to the adhesive or other coating on the primary backing.

The invention will be understood better from consideration of the following examples:

EXAMPLE I

A carpet was tufted at 56 ounces of face yarn per square yard, with a nylon fiber having a denier of 4400. The primary backing included a first backing layer comprising a 15 foot wide "Poly ABC" style 2225 from Amoco Fabric and Fibers Company and a second backing layer of fiber glass, style 4802 from CSX Fiberglass Products, The tufting was performed on a 3/16 gauge tufting machine. No shrinkage was observed in this carpet, but a two- to three-inch shrinkage was observed when a similar carpet was made without the second backing layer of fiber glass. The tufted carpet described above was back coated with a polyurethane having the following formulation:

| Ingredient | Parts/Hundred |
| --- | --- |
| Arco Chemical Froth Polyol | 92.0 |
| Diethylene Glycol | 8.0 |
| Catalyst LC-5615 | 1.0 |
| Silicone L-5614 | 0.5 |
| Black | 0.05 |
| Aluminum trihydrate | 200.0 |
| Water | 0.2 |
| Isocyanate Bayer E-448 | 64.0 |

The process for applying the polyurethane coating is well known in the art, and is described in the following U.S. patents assigned to Union Carbide: U.S. Pat. No. 3,772,224, U.S. Pat. No. 3,849,156, U.S. Pat. No. 3,947,386, and U.S. Pat. No. 4,022,941, as well as in the following U.S. patents assigned to Dow Chemical: U.S. Pat. No. 5,104,693 and U.S. Pat. No. 4,853,054, as well as in U.S. Pat. No. 4,035,529 assigned to Bayer.

EXAMPLE II

The carpet of Example I was tufted using as the second backing layer an open weave polypropylene "Action Bac" style 3870 from Amoco Fabrics and Fibers Company, instead of the fiberglass.

EXAMPLE III

The carpet of Example I was tufted using as the second backing layer an open weave polyester fabric instead of the fiberglass.

The tensile and elongation properties of the carpets made according to Example I, Example II and Example III are as follows:

|  | EXAMPLE I | EXAMPLE II | EXAMPLE III |
| --- | --- | --- | --- |
| Tensile Strength (psi)-Warp | 405 | 158.3 | 359 |
| Elongation-Warp | 6.0 | 17.11 | 25.7 |
| Tensile Strength (psi)-Fill | 375 | 118.8 | 346.2 |
| Elongation-Fill | 5.5 | 17.11 | 25.2 |

EXAMPLE IV

A carpet was tufted at 32 ounces per square yard with a nylon fiber having a denier of 3750. The primary backing was comprised of a first backing layer of a 12 foot wide "Poly Bac" style 2200 from Amoco Fabrics and Fibers Company and a second backing layer of an open weave fabric of polypropylene, style 3870, from Amoco Fabrics and Fibers Company. The carpet was tufted on a ⅛ gauge tufting machine. No shrinkage was measured. The resulting carpet was back coated with a latex containing 125 parts calcium carbonate at 32 ounces per square yard. During the back coating process, the carpet shrank by only ¼ inch, as opposed to 3 to 6 inches for conventional carpet. In addition, the carpet had a tuft bind of 22.4 pounds versus 17.6 pounds for the same carpet with a single-layer primary backing.

EXAMPLE V

A cut pile carpet for residential use was tufted at 45 ounces per square yard of a nylon BCF yarn. The first backing layer of the primary backing was comprised of woven polypropylene (15 pick). The second backing layer of the primary backing was an open weave backing, style 850, from Synthetic Industries. The resulting carpet was back coated with 14 ounces per square yard of a hot melt adhesive supplied by Barrier-Bac, Inc. of Calhoun, Georgia and applied using a well-known hot melt pan system. The carpet exhibited fiber lock near 100%.

EXAMPLE VI

Prior to back coating of the carpet of Example V, a 1.5 mm fluid-impervious film was bonded to the back of the second layer of the primary backing according to the process of U.S. Pat. No. 5,612,113. The dimensional stability and fiber lock exhibited by this carpet were comparable to that of the carpet of Example V.

EXAMPLE VII

A carpet was tufted at 35 ounces per square yard with a nylon fiber having a denier of 3750. The primary backing was comprised of a first backing layer of a 12 foot wide "Poly Bac", style 2200, from Amoco Fabrics and Fibers Company and a second backing layer of an extruded oriented polypropylene webbing sold under the designation "Conwed OV-7100" by Conwed Corporation of St. Paul, Minn. The carpet was tufted on a ⅛ gauge tufting machine. The resulting carpet was back coated with a polyurethane as described in Example I. No shrinkage was measured either before or after back coating.

EXAMPLE VIII

A cut pile carpet for residential use was tufted at 45 ounces per square yard of a nylon BCF yarn. The first backing layer of the primary backing was comprised of woven polypropylene (15 pick). The second backing layer of the primary backing was an open weave backing, style 850, from Synthetic Industries. The resulting carpet was back coated by applying twelve ounces per square yard of "Epolene C10" polyethylene granules having a melt index of 2,250 at 190° C., such as may be obtained from Eastman Chemical Company, and heating the thermofusible granules to a temperature at or near their melting point. Upon melting of the granules, a calendaring roll was applied so as to cause the granules to coalesce and cover or encapsulate the back stitches. The resulting back coated carpet exhibited near 100% fiber lock.

EXAMPLE IX

An unbacked residential carpet such as is described in Example VIII was back coated by applying nine ounces per square yard of "Epolene C13P" polyethylene powder having a melt index of 200 at 190° C., such as may be obtained from Eastman Chemical Company, and heating the thermofusible powder to a temperature at or near its melting point so as to cause the powder to coalesce and cover or encapsulate the back stitches. The resulting back coated carpet exhibited near 100% fiber lock, even though no calendaring roll was used in the application of the back coating.

EXAMPLE X

An unbacked residential carpet such as is described in Example VIII was back coated by applying thirty ounces per square yard of "Epolene C10P" polyethylene powder having a melt index of 2,250 at 190° C., such as may be obtained from Eastman Chemical Company, and heating the thermofusible powder to a temperature at or near its melting point. Upon melting of the powder, a calendaring roll was applied so as to cause the powder to coalesce and cover or encapsulate the back stitches. The resulting carpet exhibited a smooth, liquid-impermeable back surface.

EXAMPLE XI

A low density polyethylene film having a thickness of 1.5 mm was applied prior to application of the calendaring roll to a residential carpet such as is described in Example X so as to produce a back-coated carpet having an additional liquid-impermeable barrier.

EXAMPLE XII

A residential berber-style loop carpet of 90% polypropylene fibers and 10% nylon fibers was tufted at a face fiber weight of 32 ounces per square yard. The primary backing was comprised of a first backing layer of polypropylene woven material, style 12546, from Wayn-Tex, Inc. of Dalton, Ga. and a second backing layer of an open weave fabric of polypropylene, style 3870, from Amoco Fabrics and Fibers Company. This carpet was back coated by applying eleven ounces per square yard of "Epolene C13P" polyethylene powder having a melt index of 200 at 190° C., such as may be obtained from Eastman Chemical Company, and heating the thermofusible powder to a temperature at or near its melting point so as to cause the powder to coalesce and cover or encapsulate the back stitches. The resulting back coated carpet exhibited near 100% fiber lock, even though no calendaring roll was used in the application of the back coating.

EXAMPLE XIII

A carpet was tufted at 35 ounces per square yard with an olefin fiber having a denier of 8800 Dtex. The primary backing was comprised of a first backing layer of a 12 foot wide "Poly Bac" material having a 15 pick, from Amoco Fabrics and Fibers Company, and a second backing layer of an open weave fabric of polypropylene, style 3870, from Amoco Fabrics and Fibers Company. Interposed between the first backing layer and the second backing layer was a third backing layer of a non-woven spun-bonded polyester sold under the designation "Colbac GFT-80" by Akzo Fibers B.V. The tufted carpet was back coated with 24 ounces of polyurethane as described in Example I. No shrinkage was measured.

EXAMPLE XIV

A carpet was tufted at 35 ounces per square yard with an olefin fiber having a denier of 8800 Dtex. The primary backing was comprised of a first backing layer which formed the lower layer and a second backing layer which formed the upper layer. The first backing layer comprised a non-woven spun-bonded polyester sold under the designation "COLBAC GFT-80" by Akzo Fibers B.V., and the second backing layer comprised a 12 foot wide "Poly Bac" material having a 15 pick from Amoco Fabrics and Fibers Company. The tufted carpet was back coated with 24 ounces per square yard of polyurethane as described in Example I. No shrinkage was measured. From the foregoing it will be understood that the present invention provides a carpet having a superior dimensional stability from the time of tufting, through coating, and through installation and use. The carpet is not as severely affected by stress during coating, nor by heat during coating or curing. Even without the application of a secondary backing, the carpet of the present invention can be stretched into place or can be glued down, without fear of stretch causing unsightly bulges or interfering with any pattern therein.

Although this description contains many specifics, these should not be construed as limiting the scope of the invention but as merely providing illustrations of some of the presently preferred embodiments thereof, as well as the best mode contemplated by the inventor of carrying out the invention. The invention, as described herein, is susceptible to various modifications and adaptations, and the same are intended to be comprehended within the meaning and range of equivalents of the appended claims.

What is claimed is:

1. A tufted carpet comprising:
   (a) a primary backing comprised of at least two layers, including:
      (i) a first backing layer which comprises a nylon-coated non-woven, spun-bonded polyester material;
      (ii) a second backing layer which comprises a woven material comprised of ribbons of polypropylene, polypropylene or combinations of polypropylene and polyethylene;
   (b) a plurality of tufts of yarn sewn through the primary backing, said tufts of yarn:
      (i) being exposed on one side of the primary backing for forming face yarns; and
      (ii) forming a plurality of back stitches on the opposite side of the primary backing.

2. The tufted carpet of claim 1 wherein the primary backing includes a third backing layer that is interposed between the fat backing layer and the second backing layer, said third backing layer comprising a material that is different from the materials which comprise the first and the second layers, which material of the third backing layer is selected from the group consisting of:
   (a) a woven material of ribbons of polypropylene, polyethylene or combinations of polypropylene and polyethylene
   (b) a woven fiber glass material
   (c) a nylon-coated non-woven, spun-bonded material comprised of polyester, polypropylene or polyester,
   (d) a leno weave material, and
   (e) an open weave material.

3. The tufted carpet of claim 1 which includes a back coating that covers and encapsulates the back stitches and locks in the fibers.

4. The tufted carpet of claim 3 wherein the back coating is comprised of a quantity of particulate thermofusible material having a melting point lower than that of the materials comprising the first and second layers of the primary backing, which material has been applied to the back of the primary backing and heated so that it coalesces and encapsulates the back stitches.

5. The tufted carpet of claim 4 wherein the particulate thermofusible material comprising the back coating is selected from the group consisting of powders and granules of polyethylene, ethylene vinyl acetate, ethylene vinyl acrylate, low-melting point polyamide and syndiotactic polypropylene.

6. The tufted carpet of claim 4 which includes a secondary backing material which has been applied to the back of the back coating on the primary backing.

7. The tufted carpet of claim 1 wherein the primary backing includes a third backing layer that is interposed between the first backing layer and the second backing layer, said third backing layer comprising an open weave or leno weave material.

8. A tufted carpet comprising:
(a) a primary backing comprised of at least two layers, including:
   (i) a first backing layer which comprises:
      (1) a woven material,
      (2) a non-woven material, or
      (3) a composite of a woven or non-woven material and a plastic sheet material; and
   (ii) a second backing layer which comprises:
      (1) a woven material comprised of ribbons of polypropylene, polyethylene or combinations of polypropylene and polyethylene,
      (2) a woven fiber glass material,
      (3) a leno weave material,
      (4) an open weave material,
      (5) a plastic net, or
      (6) a plastic sheet material;
(b) a plurality of tufts of yarn sewn through the primary backing, said tufts of yarn:
   (i) being exposed on one side of the primary backing for forming face yarns; and
   (ii) forming a plurality of back stitches on the opposite side of the primary backing;
(c) a back coating that covers and encapsulates the back stitches and locks in the fibers;
(d) a secondary backing material which is applied to the back of the back coating, said secondary backing material being comprised of a co-extruded polyethylene film comprised of a first component and a second component, wherein the first component of the co-extruded film has a lower melting point than the second component, and wherein the first component of the co-extruded film is applied to the back of the back coating on the primary backing.

9. The tufted carpet of claim 8 wherein the back coating is comprised of a quantity of particulate thermofusible material having a melting point lower than that of the materials comprising the first and second layers of the primary backing, which material has been applied to the back of the primary backing and heated so that it coalesces and encapsulates the back stitches.

10. The tufted carpet of claim 9 wherein the particulate thermofusible material comprising the back coating is selected from the group consisting of powders and granules of polyethylene, ethylene vinyl acetate, ethylene vinyl acrylate, low-melting point polyamide and syndiotactic polypropylene.

\* \* \* \* \*

UNITED STATES PATENT AND TRADEMARK OFFICE
CERTIFICATE OF CORRECTION

PATENT NO. : 6,475,592 B1  Page 1 of 1
DATED : November 5, 2002
INVENTOR(S) : Donald A. Irwin, Sr.

It is certified that error appears in the above-identified patent and that said Letters Patent is hereby corrected as shown below:

<u>Column 14,</u>
Line 32, delete "fat" and substitute therefor -- first --.

Signed and Sealed this

Eighteenth Day of February, 2003

JAMES E. ROGAN
*Director of the United States Patent and Trademark Office*

UNITED STATES PATENT AND TRADEMARK OFFICE
CERTIFICATE OF CORRECTION

PATENT NO. : 6,475,592 B1
DATED : November 5, 2002
INVENTOR(S) : Donald A. Irwin, Sr.

It is certified that error appears in the above-identified patent and that said Letters Patent is hereby corrected as shown below:

Column 14,
Line 22, delete "polypropylene" (first occurrence) and substitute therefor
-- polyethylene --.

Signed and Sealed this

Ninth Day of September, 2003

JAMES E. ROGAN
*Director of the United States Patent and Trademark Office*